Patented July 31, 1951

UNITED STATES PATENT OFFICE 2,562,558

STARCH PREPARATION SOLUBLE IN COLD WATER AND PROCESS OF MAKING THE SAME

Jan Lolkema, Hoogezand, and Willem Albertus van der Meer, Haren, Netherlands, assignors to Naamlooze Vennootschap W. A. Scholten's Chemische Fabrieken, Groningen, Netherlands, a corporation of the Netherlands No Drawing. Application November 1, 1946, Serial No. 707,325. In the Netherlands August 18, 1944

Section 1, Public Law 690, August 8, 1946
Patent expires August 18, 1964

3 Claims. (Cl. 260—17.3)

United States Patent No. 2,246,635 describes a process of manufacturing starch preparations, which process consists in heating a mixture of starch with water and an aldehyde, preferably formaldehyde on a rotary drum to a temperature adapted to remove the water and to gelatinize the starch or starch derivative, while pressing out the mass under mechanical pressure to a thin layer, which is simultaneously or immediately thereafter dried. In this manner products are obtained that, like ordinary cold swelling starch, are soluble in cold water. When the solution after the addition of a catalyst, particularly of an acid or a compound capable of splitting off an acid, is dried on a carrier, there are formed water resistant layers. This effect may still be improved by the presence of a substance that in combination with aldehyde is capable of forming a synthetic resin, e. g. urea. This synthetic resin component may be added to the solution of the cold swelling starch product obtained in the manner described above.

It is also possible, however, to use two cold swelling starch preparations, one of which has been prepared in the presence of the aldehyde, the other in the presence of the synthetic resin component, if desired with the addition of a catalyst. It was not considered possible to prepare a cold swelling starch from a mixture of starch with a limited quantity of water containing both the aldehyde and a synthetic resin component, since in that case the formation of the synthetic resin would already take place in the course of the "cold swelling starch process," so that the product obtained would not be sufficiently soluble, even if the catalyst had not been added as yet.

It is, moreover, known from Dutch patent specifications No. 45,877 and No. 47,805 to prepare condensation products of aminotriazines, more particularly triamino-2.4.6 triazine-1.3.5 (melamine) and to use the same for fixing starch finishes so that they are wash-proof. This is accomplished by boiling the starch with water, cooling the hot paste and subsequently adding the condensation product and a catalyst, e. g. an acid.

The invention has for its object a process of manufacturing dry starch preparations soluble in cold water to solutions which after the addition of a catalyst for the condensation when dried on the surface of a material will produce insoluble films and are excellent finishing, dressing, sizing, adhesive and binding agents, the said process consisting in submitting a starch material containing free hydroxyl-groups in a substantially non-acid medium to the cold swelling starch process in the presence of melamine and formaldehyde.

The starch or the starch derivative is gelatinized thereby, in so far as this has not already occurred during the preliminary treatment, and dried simultaneously or immediately thereafter, so that the material leaving the cylinders consists of thin fleeces or scales that may be ground up if desired. The known one or two cylinder drying apparatuses may be used for this purpose. If desired, one may also use vacuum drum driers, by means of which it is possible to carry out the cold swelling starch process at temperatures below 100° C.

The term "starch material" as used in the specification and claims is meant to include not only the usual types of starch such as potato, tapioca, corn, wheat and rice starch, but also chemically modified or soluble starches and ethers, esters and ether-esters of starch which still contain free hydroxyl groups.

The aminotriazines mentioned in Dutch patent specifications No. 45,877 and No. 47,805 are suitable for the purpose. We preferably use melamine since it produces starch preparations possessing excellent properties and the invention will be described hereinafter particularly with regard to the use of this substance.

The term "formaldehyde" also includes substances yielding formaldehyde such as paraformaldehyde, trioxymethylene and the like.

The acid catalyst for the condensation referred to in the claims is an acid or a substance generating acid when heated. If desired the aldehyde may be added in the form of an aldehyde cold swelling starch as described in Dutch patent application No. 113,616.

We have found that under the circumstances indicated above products are obtained which readily swell or dissolve in cold water. Insoluble condensation products of the aminotriazine, the aldehyde and the cold swelling starch, however, are formed when this solution is dried at a high temperature in the presence of catalysts, such as acids or substances capable of producing acids, e. g. when using the products as finishing, sizing or binding agents, adhesives and the like.

This unexpected result is due to the short period of heating which is characteristical for the cold swelling starch manufacturing process and to the specific properties of the aminotriazine which do not yet form insoluble condensation products with the aldehyde and the starch when subjected to this short heating process in an approximately neutral or alkaline medium. The aminotriazines also possess the advantage of having a high melting point, so that they do not melt during the cold swelling starch process like e. g. urea which would cause difficulties when scraping the layer from the surface of the drying cylinder. Melamine will remain solid under the said conditions so that cold swelling starch preparations are obtained which contain this substance in a finely and uniformly divided condition, even when relatively large proportions of melamine are used.

Besides the reaction of the mixture the temperature of the surface of the drying drum, that is to say the temperature at which the cold swelling starch process is carried out, will also influence the solubility of the dry product, as the solubility will decrease in proportion to the increase of the drying temperature. It is therefore advisable to carry out the cold swelling starch process at a temperature as low as possible, e. g. by using a vacuum drying drum. The solubility is also influenced by the duration of the drying or heating period which is determined by the rotation speed of the drying drum, the quantity of water contained in the mixture, the thickness of the layer of the reaction mass during the drying period etc. The pH of the mixture which must be approximately 7 or higher is more or less dependent on the other reaction conditions; generally speaking the lower the drying temperature and the shorter the duration of the drying treatment, the higher the pH can be.

Instead of adding the melamine and the aldehyde as such to the mixture of starch or a starch derivative and a small quantity of water to be converted into cold swelling starch, we may also add a pre-condensate of the said two substances to this mixture. In this case too there is no substantial condensation during the cold swelling starch process, provided care is taken that the mass has an approximately neutral or alkaline reaction.

The aminotriazine condensation products may be used in various stages of condensation, e. g. primary condensation products having an unlimited solubility in water or products that are still water soluble to a limited degree or not at all, provided that they are not completely condensed and converted into a resin, but are still containing a sufficient quantity of reactive methylol groups for reacting with starch to form insoluble products.

The cold swelling starch preparations obtained according to the invention are distinguished from the prior products as disclosed in U. S. Patent 2,246,635 in that they contain both the aldehyde and the synthetic resin component (melamine) embedded within the cold swelling starch particles, whereas the said prior products consist of a mixture of cold swelling starch particles having formaldehyde embedded therein and separate particles consisting of or containing a synthetic resin component.

It is possible to improve the solubility of the above mentioned dry products by first completely or partially etherifying or esterifying such precondensates of an aminotriazine and an aldehyde. The term "precondensates" when used in the appending claims is meant to include such etherified and/or esterified precondensates. It is a well known fact that such pre-condensates, e. g. trimethylol and hexamethylol melamine, contain a number of methylol groups which may be etherified with different kinds of alcohols (cf. e. g. Dutch patent specifications Nos. 45,877 and 47,805).

French specification No. 881,495 discloses a process of forming insoluble layers on carriers based upon the feature that a starch solution together with a polyfunctional etherifying or esterifying agent and alkali is dried upon a carrier. The polyfunctional etherifying or esterifying agent according to this process is condensed with two or more starch molecules, whereby water insoluble compounds of high molecular weight are formed. In the present case the melamine precondensates will act as polyfunctional etherifying agents for the starch, so that insoluble compounds are formed, as soon as the said pre-condensates begin to react with the starch, which will be the case in the presence of an acid that will act as a condensation catalyst. If, however, the methylol groups in the melamine condensates are completely or partially etherified or esterified and thereby "blocked up," they will react much less readily with the starch, since this is only possible if the alcohol or the acid with which the methylol groups are etherified or esterified are first split off. For the last reaction acids will also act as catalysts.

When using pre-condensates of aminotriazines in which the methylol groups have been completely or partially etherified and/or esterified, the reaction of the mixture subjected to the cold swelling starch process should also be approximately neutral or alkaline, but the presence of a small quantity of acid has a much smaller effect than in the case of the non-blocked up pre-condensates, so that it is possible to operate without much danger even in a slightly acid medium. In a decidedly acid medium, however, condensation will occur already during the cold swelling starch process, so that the product obtained will not be sufficiently soluble.

If the starch derivative used is an ether or ester the etherification or esterification of the starch may be carried out simultaneously with the etherification or esterification of the pre-condensate of the aminotriazine and the aldehyde.

The solutions produced by dissolving the cold swelling starch preparations according to the invention in cold water may contain the synthetic resin components, or the pre-condensate of the same, either in a dissolved, emulsified or suspended condition.

The proportions in which the different substances are used may vary within wide limits. One may already obtain with limited quantities of melamine, layers or films of starch that are highly water resistant, owing to the fact that in the reaction of starch with a melamine pre-condensate as a polyfunctional etherifying agent a plurality of starch molecules may react with a single melamine molecule.

If desired, one may also work with large quantities of melamine, without experiencing any difficulties with the cold swelling starch process.

The starch preparations described above possess the property that they are soluble even in cold water, which has the advantage that there is no need of being afraid of a premature formation in the solution of insoluble starch compounds, e. g. in the finishing bath.

The method of finishing and sizing in cold baths, however, generally has the disadvantage that the said baths do not penetrate into and between the fibres so well, owing to the higher viscosity of the cold solutions. It would therefore be advantageous to be able to raise the temperature of the impregnating bath to e. g. 50° C., if this purpose could be attained without too far advanced a condensation occurring in the impregnating liquid, whereby insoluble products are produced. These, however, will be formed indeed, if mixtures already containing the catalyst are dissolved in hot water. In this case one is therefore obliged to use preparations that do not contain any acid as yet; the acid is to be added separately and immediately before the finishing or sizing treatment, since the hot acid containing finishing or sizing paste can only be used for a very short time.

This difficulty may be obviated by adding in the manner more generally described in Dutch patent application No. 118,566 to the mixture of cold swelling starch with an aminotriazine and an aldehyde or an aldehyde producing substance, or a precondensate thereof, such a quantity of a non- or only slightly volatile acid and/or of a substance producing an acid when heated, that a solution of the concentration desired in practice has a pH of at least 5 and remains fit for use at a moderately elevated temperature for a sufficiently long time, but when dried on a carrier at a high temperature will produce the acid reaction required for the final condensation. In this case the acidity of the finishing or sizing paste obtained by dissolving the dry mixture will be so low that at a temperature of about 50° C. the further condensation will proceed very slowly, so that the bath will remain fit for use for a long time; during the drying treatment at a higher temperature the acidity will increase considerably, so that in the end one still obtains insoluble layers that are highly water resistant. This purpose may be obtained by adding to the dry mixture such a quantity of a non-volatile or very slightly volatile, preferably solid acid that a solution of the mixture in water of the concentration usual e. g. for a finishing bath has a pH of approximately 5 or more; during the drying of this solution on the fabric the degree of acidity of the liquid will increase considerably and become so high that the final condensation of the synthetic resin will proceed completely and with sufficient speed.

One may also add for this purpose substances that have no or only a very slight acid reaction at ordinary temperatures, but will split off acid at more elevated temperatures, for instance salts of sulphuric acid esters obtained from alkenes or alcohols, such as sodium hexyl sulphate, various ammonium salts of strong inorganic as well as organic, preferably only slightly volatile, acids, such as ammonium oxalate, substances that possess adsorbing properties, such as bleaching earths, diatomaceous earths, or synthetic resins that have been treated with an acid and subsequently have been freed from acid by washing them with water, to such a degree that at normal temperatures and in an aqueous medium they will show an approximately neutral reaction, whereas at higher temperatures they will split off acid, and the like.

If desired, one may still add to the dry mixture, apart from the acid or substance that will split off acids, buffer materials such as mixtures of primary and secondary alkali-phosphate.

It is advantageous to make preparations containing cold swelling starch in which the starch molecule is more or less degraded and which has been obtained by adding chemicals degrading the starch, e. g. alkalies and/or oxidizing agents, prior to or during the cold swelling starch process. With regard to the usual cold swelling starches which are not, or not appreciably degraded, they have the advantage of dissolving better in water and of maintaining the components of the synthetic resin, or the precondensate thereof, better in a dissolved or suspended state, and of producing a smoother solution, so that it will be possible to produce adhesives which may be readily applied with a brush in a thinner layer and, moreover, may contain a larger quantity of cold swelling starch, without producing too high a viscosity.

Adhesives of this kind will blot less and will dry up more readily than adhesives of the same viscosity prepared with ordinary cold swelling starch. Impregnating agents for textile materials, paper and the like prepared with the aid of these decomposed cold swelling starches will penetrate better and affect the designs of the textile material to a lesser degree.

The above mentioned advantages of a certain degree of degradation of the starch molecule prior to or during the cold swelling starch process may also be obtained or increased by completely or partially etherifying or esterifying the cold swelling starches after the method described in French patent specification No. 874,436.

The preparations obtained according to the invention are particularly suitable for finishing and sizing textile materials. They have the advantage of dissolving in cold water, so that one obtains finishing and sizing baths ready for use, while avoiding a laborious process of preparation, whereas it had hitherto been necessary first to dissolve the starch in a hot medium and then allow the solution to cool before it was possible to add the synthetic resin components, or the pre-condensate thereof, and the catalyst.

The preparations, moreover, may be applied in a much simpler manner, since the preparation to be dissolved in cold water already contains both of the synthetic resin components, so that it will only be necessary to add the acid to the solution.

Moreover the condensation during the drying treatment will proceed very satisfactorily, because of the fact that cold swelling starch is far more reactive than ordinary starch, so that it is easy to obtain layers that are highly water resistant.

Apart from their use as finishing and sizing agents, the preparations according to the invention are also important for other purposes for which insoluble layers must be applied to a carrier. The products may be used e. g. for treating dyed textile fabrics to improve the resistance of the colours to washing, for rendering the same non-creasing, shift fast and pile fast, for increasing the resistance of fabrics to abrasion and wear and tear, for fixing pigments washproof on textile materials and furthermore for pasting and glueing, e. g. in the wood industry, for sizing paper, as a thickening or fixing agent for paper or textile printing, as a binding agent for all kinds of pulverized, granular or fibrous materials (priming, cementing, water colouring, briquetting, artificial cork, fibre- and artificial wood plates) and the like.

The use of the above preparations obtained according to the cold swelling starch process may, furthermore be simplified by incorporating into the dry products the constituent necessary for the formation of the insoluble material under such conditions that a substantial reaction will not yet occur. In fact it is possible to make preparations containing the two synthetic resin components as well as the catalyst, in such a manner that they keep very well during storage in a dry condition. This can be obtained e. g. by mixing a product obtained by converting a starch suspension to which a pre-condensate in "blocked-up" condition has been added into cold swelling starch, with a solid acid, or an acid producing compound and to store the dry mixture with the exclusion of the atmospheric humidity.

Because of the fact that the synthetic resin forming agent is, so to say, embedded in the cold swelling starch, the reaction in the dry product will proceed very slowly, so that the mixture may be stored a long time before becoming insoluble. If desired the catalyst may also be added to the dry mixture in the form of a cold swelling starch preparation. In the latter case the danger of a premature condensation is obviated still further, because the catalyst also is embedded in cold swelling starch particles, so that there will be no or no substantial contact between the synthetic resin components and the catalyst in the dry mixture. This will only be the case when the dry preparation is dissolved in water.

The products according to the invention, if desired, may contain a limited quantity of native starch or of a starch derivative that will not swell or dissolve in cold water and which is suspended during the dissolving of the cold swelling starch and which during the drying or the heating of the paste will likewise react with the melamine and the aldehyde, or with a pre-condensation product of the said substances.

*Examples*

I. 50 parts by weight of melamine and 1000 parts by weight of thin boiling starch are suspended in a mixture of 500 parts by weight of a formaldehyde solution of 30% by weight and 650 parts by volume of water. This suspension is adjusted to a neutral or slightly alkaline reaction and converted into cold swelling starch in the usual manner. The preparation thus obtained will dissolve very well in cold water.

II. 52 parts by weight of melamine are condensed with 250 parts by weight of a 30% formaldehyde solution by heating the reaction mixture having a pH of 8 in a boiling water for 10–15 minutes. The solution of the pre-condensate thus obtained is then diluted with 800 parts by volume of water, after which 1000 parts by weight of native starch are added. The mixture is converted in a neutral or slightly alkaline medium on a heated rotating cylinder at a temperature of about 120–130° C. into cold swelling starch in the usual manner. The cold swelling starch thus obtained will dissolve extremely well in cold water.

III. A solution prepared according to Example II of a pre-condensation product of melamine and formaldehyde is dried by evaporation in vacuo at a temperature of 60° C. and subsequently ground. The ground product is suspended in 300 parts by volume of methanol and the mixture adjusted to a slightly acid reaction. The mixture is then boiled during some time with a reflux cooler, after which diluted caustic soda is added until the solution will show a slightly alkaline reaction on phenolphtalein. The excess of methanol is removed by distillation in vacuo. The residue is added to a suspension of 1000 parts by weight of starch in 1500 parts by volume of water. The mixture is adjusted to a neutral or slightly alkaline reaction and subsequently heated while energetically stirring the same until gelatinization sets in, after which the mass thus obtained is submitted to the cold swelling starch process. In this manner one obtains a cold swelling starch preparation that is perfectly soluble in cold water.

IV. A mixture of 630 parts by weight of melamine and 1500 parts by weight of a 30% by weight formaldehyde solution having a pH of 7 is heated while agitating in a boiling water bath with a reflux cooler until a sample of the reaction mixture gives a precipitate when diluted with 2 parts by volume of water. The resulting solution of the melamine-aldehyde condensation product is added to a mass obtained by decomposing a suspension of from 200 to 1000 parts by weight of potato starch in 200–1000 parts by volume of water in an alkaline medium with from 10 to 50 parts by weight of a 3% hydrogen peroxide solution. The mixture is given a pH of 8 and converted into a cold swelling starch preparation in the usual way. In this manner one obtains a dry product that will readily dissolve in cold water.

V. A mixture of 50 parts by weight of hydroxy-2 diamino-4,6 triazine 1.3.5 (ammeline), 250 parts by volume of an about 40 volume % commercial formaline and 500 parts by volume of 1 N hydrochloric acid is boiled for half an hour with a reflux cooler. After only a few minutes boiling the ammeline has been completely dissolved. The clear solution of the condensation product is diluted with 500 parts by volume of water, after which 1000 parts by weight of starch are added. The mixture is converted in a known manner into cold swelling starch in a neutral or slightly alkaline medium. The preparation thus obtained will dissolve very readily in cold water.

VI. A mixture of 50 parts by weight of hexamethylol melamine and 135 parts by volume of methanol is adjusted to a pH of about 4 and boiled for a few hours with a reflux cooler. After the mixture has cooled off, there are added 750 parts by volume of water and 500 parts by weight of starch, after which the suspension is adjusted to a pH of 6. The slightly acid suspension is converted in the usual manner into cold swelling starch at a temperature of about 110° C. The cold swelling starch thus formed will dissolve very well in cold water.

We claim:

1. A process of manufacturing dry starch preparations soluble in cold water to solutions which after the addition of an acid catalyst for the condensation when dried on the surface of a material will produce insoluble films, which comprises heating a substantially non-acid mixture of a starch material containing free hydroxyl groups, a restricted quantity of water and a material of the group consisting of a mixture of melamine and formaldehyde and a precondensate of melamine and formaldehyde on a rotary drum to a temperature adapted to remove the water and to gelatinize the starch material while pressing out the said mixture under mechanical pressure to a thin layer, which is simultaneously dried and comminuting the dry film.

2. A process of manufacturing dry starch preparations soluble in cold water to solutions which after the addition of an acid catalyst for the condensation when dried on the surface of a material will produce insoluble films which comprises heating a substantially non-acid mixture of starch ether containing free hydroxyl groups, a restricted quantity of water and a material of the group consisting of a mixture of melamine and formaldehyde and a precondensate of melamine and formaldehyde on a rotary drum to a temperature adapted to remove the water and to gelatinize the starch material, while pressing out the said mixture under mechanical pressure to a thin layer, which is simultaneously dried and comminuting the dry film.

3. Dry starch preparations soluble in cold water to solutions which after the addition of an acid catalyst for the condensation when dried on the surface of a material will produce insoluble films, comprising particles of a cold swelling starch ether containing free hydroxyl groups having a material of the group consisting of a mixture of melamine and formaldehyde and a precondensate of melamine and formaldehyde homogeneously distributed throughout each cold swelling starch particle.

JAN LOLKEMA.
WILLEM ALBERTUS van der MEER.

REFERENCES CITED

The following references are of record in the file of this patent:

UNITED STATES PATENTS

| Number | Name | Date |
| --- | --- | --- |
| 2,246,635 | Moller | June 24, 1941 |
| 2,275,314 | Pierson | Mar. 3, 1942 |
| 2,302,309 | Glarum | Nov. 17, 1942 |
| 2,400,820 | Glarum | May. 21, 1946 |
| 2,408,065 | Hansen | Sept. 24, 1946 |

FOREIGN PATENTS

| Number | Country | Date |
| --- | --- | --- |
| 527,704 | Great Britain | Oct. 15, 1940 |
| 881,495 | France | Jan. 28, 1943 |
| 741,030 | Germany | Nov. 3, 1943 |